Nov. 5, 1957 M. W. ALLEN 2,812,135

BINARY ADDER-SUBTRACTOR TUBE AND CIRCUIT

Filed Aug. 11, 1954 6 Sheets-Sheet 1

Nov. 5, 1957 M. W. ALLEN 2,812,135

BINARY ADDER-SUBTRACTOR TUBE AND CIRCUIT

Filed Aug. 11, 1954 6 Sheets-Sheet 2

Nov. 5, 1957 M. W. ALLEN 2,812,135

BINARY ADDER-SUBTRACTOR TUBE AND CIRCUIT

Filed Aug. 11, 1954 6 Sheets-Sheet 4

United States Patent Office 2,812,135

Patented Nov. 5, 1957

2,812,135

BINARY ADDER-SUBTRACTOR TUBE AND CIRCUIT

Murray William Allen, Greenwich, New South Wales, Australia, assignor to Commonwealth Scientific and Industrial Research Organization, East Melbourne, Victoria, Australia, a body corporate of Australia Application August 11, 1954, Serial No. 449,098

Claims priority, application Australia September 8, 1953

24 Claims. (Cl. 235—61)

This invention relates to apparatus for carrying out algebraic operations on binary numbers, and more particularly to the operations of addition and subtraction.

The operations of binary addition and subtraction occur frequently in electronic digital calculating machines. To carry out binary addition or subtraction of a pair of digits of a pair of binary numbers, providing also for the carry-in of digits from a similar operation on digits of next lower significance, and for the carry-out of a digit (if necessary) for the digits of next higher significance requires six or more vacuum tubes if ordinary grid-type vacuum tubes are employed.

Thus for serial operations six or more such vacuum tubes are required, and in parallel operations six or more such vacuum tubes are required for every digit in the largest binary number to be handled. It has also been proposed to use beam deflection valves in carrying out binary addition and subtraction, but the circuits and valves are critical, and require accurate location of the electron beam of each input combination.

It is an object of this invention to provide apparatus for effecting addition and subtraction of binary numbers which requires only two electron beams, in a high vacuum, for serial operations, and only two electron beams for each digit of the highest of the numbers in parallel operations. The two electron beams are preferably provided in the one envelope, but two separate vacuum tubes, each providing only one electron beam, may be used. If a single envelope is employed the two electron beams are preferably obtained from a common cathode, either by dividing the electron beam or by providing a back to back arrangement of other electrodes.

It is a further object to provide apparatus employing such vacuum tubes which requires few additional parts for each electron beam, in which the positions of the electron beams and the amplitude of the operating pulses representing the digits are not critical, in which the D. C. potentials of the input electrodes may be made the same or substantially the same as the output electrodes, and in which the input impedance is high compared to the output impedance.

In a digital computer there are two ways of transferring digits between units. In one method the digits of the numbers are transferred in time sequence along a single channel (serial computing) so that during arithmetic operations the corresponding digits of the two numbers are paired. The carries or borrows (generally referred to hereafter as carries) resulting from an operation on a pair of digits are delayed a digit period to coincide with the next succeeding pair of digits (of next higher significance) and so on. In this method the pairs of digits are handled in succession, and the time taken for the addition or subtraction of two binary numbers is the sum of the times taken for each digit separately. In the second method (parallel computing) the digits of the numbers have separate lines and are passed simultaneously through the computing circuits, and the carries are fed between digit positions without delays. Parallel computing is therefore much faster than serial computing, but it is avoided in simple machines because the necessary duplication of the arithmetic (and gating) circuits for each digit position requires the use of large numbers of vacuum tubes. The simplification of the arithmetic circuits possible by the present invention makes parallel computing more attractive than hitherto.

In carrying out the invention two interconnected electron beam deflection units are employed for each position in the pair of numbers being operated, that is, for each pair of digits. These units may be in separate envelopes, but are preferably combined in a single envelope. Each pair of interconnected beam units requires only four resistors and preferably several diodes. The diodes, preferably crystal diodes, are not theoretically necessary, but permit wider tolerances in the vacuum tubes and components. Appropriate potential and current sources are, of course, necessary.

The result of the arithmetic operations are, of course, stored in the usual manner by any appropriate and known means.

According to this invention apparatus for effecting simultaneously the two algebraic operations on binary digits which can be represented by the equations $$X+Y+C_{in}\geqslant n$$

$$X+Y+C_{in}+2C_{out}\geqslant 1$$

where X and Y represent binary digits (positive or negative), $C_{in}$ represents a binary digit (positive or negative) resulting from similar operations on digits of immediately lower significance, $C_{out}$ represents a binary digit (positive or negative) of immediately higher significance resulting from the operation, and $n$ is 1 or 2, comprises means for forming a first beam of electrons, four deflecting electrodes for the first beam arranged to produce deflection of the beam in the same direction (disregarding sense), a target electrode for the first electron beam, means for forming a second beam of electrons, four deflecting electrodes for said second beam, arranged to produce deflection of the beam in the same direction (disregarding sense) a target electrode for the second beam, all deflecting electrodes for the first and second beams having substantially the same deflection sensitivity, means for applying pulses of given amplitude corresponding to the digit X to a first of the deflecting electrodes for the first beam and to a first of the deflecting electrodes for the second beam, means for applying pulses of said given amplitude corresponding to the digit Y to a second of the deflecting electrodes for the first beam and to a second of the deflecting electrodes for the second beam, means for applying pulses of said given amplitude corresponding to the digit $C_{in}$ to a third of the deflecting electrodes for the first beam and to a third of the deflecting electrodes for the second beam, the said given amplitude and the operating potentials being so selected, and the polarities of the pulses being so chosen with regard to the deflecting electrodes to which they are applied and the signs of the symbols in the above equations, that the target electrode for the second beam gives a "carry-out" pulse only when the first equation above is satisfied, means for obtaining a second "carry-out" pulse having an amplitude whose magnitude is twice the said given amplitude and applying it to the fourth of the deflecting electrodes for the first beam whereby the target electrode for the first beam gives an output pulse only when the second equation above is satisfied.

Also accordiing to this invention apparatus for effecting addition of two binary digits X and Y comprises a beam deflection electron vacuum tube including a cathode, means for generating a beam of electrons, a first pair of deflecting electrodes $D_1$ and $D_2$, means for dividing the electron beam into two sections, a pair of deflecting electrodes $D_3$ and $D_4$ for the first of said sections, a pair of deflecting electrodes $D_{3'}$ and $D_{4'}$, for the second of said sections, all odd-numbered deflecting electrodes producing deflection in one direction and all even numbered deflecting electrodes producing deflection in the opposite direction for similarly poled potentials applied thereto, a first target electrode $T_1$ for the said first section positioned so that the electron beam does not fall on it when all deflecting electrodes are at the same potential, but a pulse of given amplitude of appropriate polarity applied to any deflecting electrodes $D_1$, $D_2$, $D_3$ and $D_4$ brings the said first section of the electron beam on the target, a divided second target electrode having parts $T_2$ and $T_{2'}$ for the second of the sections, resistances connected between the target electrodes and a high tension source, means for applying pulses of one polarity and of said given amplitude corresponding to the first digit X to deflecting electrode $D_1$, means for applying pulses of said one polarity and of said given amplitude corresponding to the second digit Y to deflecting electrodes $D_3$ and $D_{3'}$, means for applying pulses of opposite polarity and of said given amplitude corresponding to a "carry-in" number to deflecting electrodes $D_2$, means for biasing deflecting electrode $D_{4'}$ so that the second section of the electron beam falls on part $T_2$ of the second target and requires simultaneous pulses of said given amplitude on at least two of the deflecting electrodes $D_1$, $D_2$ and $D_{3'}$ to move it onto part $T_{2'}$ of the second target, a connection between the part $T_{2'}$ of the second target electrode and the deflecting electrode $D_4$ whereby a pulse of substantially twice the given amplitude is applied to the electrode $D_4$ when the said second section of the electron beam falls on said part $T_{2'}$, a sum output terminal connected to the said first target electrode $T_1$, and a "carry-out" output terminal connected to the part $T_2$ of the second target electrode.

Also according to this invention apparatus for effecting subtraction of a binary digit Y from a binary digit X comprises a beam deflection electron vacuum tube including a cathode, means for generating a beam of electrons, a first pair of deflecting electrodes $D_1$ and $D_2$, means for dividing the electron beam into two sections, a pair of deflecting electrodes $D_3$ and $D_4$ for the first of said sections, a pair of deflecting electrodes $D_{3'}$ and $D_{4'}$ for the second of said sections, all odd-numbered deflecting electrodes producing deflection in one direction and all even numbered deflecting electrodes producing deflection in the opposite direction for similarly poled potentials applied thereto, a first target electrode for the said first section positioned so that the electron beam does not fall on it when all deflecting electrodes are at the same potential but a pulse of given amplitude of appropriate polarity applied to any deflecting electrode $D_1$, $D_2$, $D_3$ and $D_4$ brings the said first section of the electron beam on the target, a second target electrode for the second of said sections, resistances connected between the target electrodes and a high tension source, means for applying pulses of one polarity and of said given amplitude corresponding to the digit X to deflecting electrode $D_1$, means for applying pulses of said one polarity and of said given amplitude corresponding to the digit Y to deflecting electrodes $D_4$ and $D_{4'}$, means for applying pulses of said one polarity and of said given amplitude corresponding to a "borrow" digit to deflecting electrode $D_2$, means for biasing deflecting electrode $D_{3'}$ so that the second section of the electron beam does not fall on target $T_2$ and, in the absence of a pulse on $D_1$, requires a pulse of said given amplitude and polarity on at least one of the electrodes $D_2$ and $D_{4'}$, and in the presence of a pulse or said given amplitude and polarity on $D_1$ requires pulses of said given amplitude and polarity on both electrodes $D_2$ and $D_{4'}$ to move it onto the target, a connection between the target $T_2$ and the deflecting electrode $D_3$ whereby a pulse of substantially twice the given amplitude is applied to the electrode $D_3$ when the said second section of the electron beam falls on target electrode $T_2$, a difference output terminal connected to the first target electrode $T_1$, and a "borrow-out" terminal connected to the second target electrode $T_2$.

Reference will now be made to the accompanying drawings in which.

Figure 1:
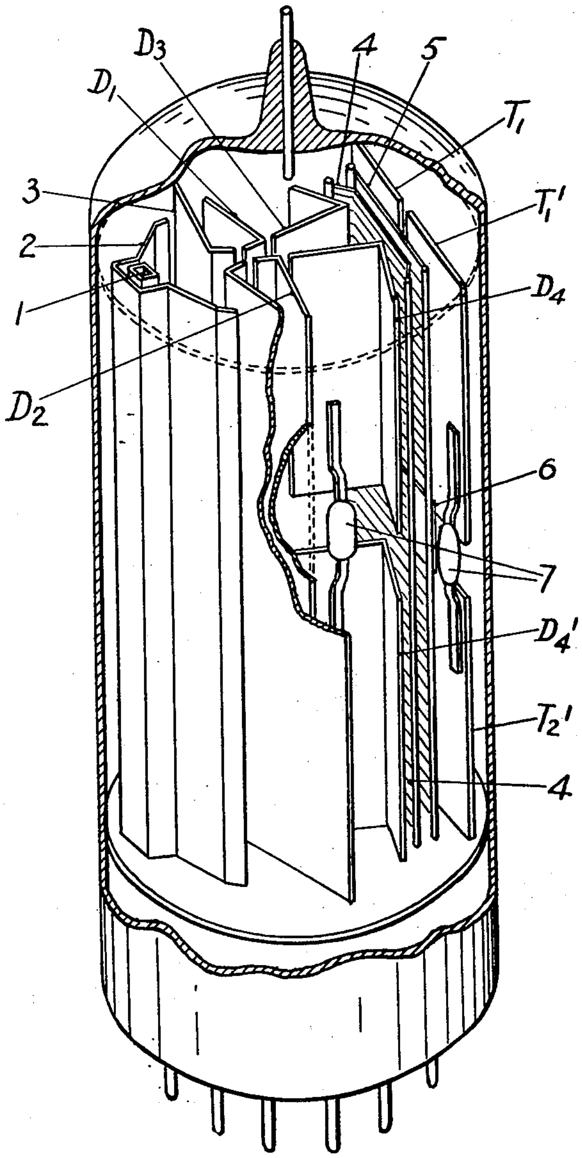
Fig. 1 illustrates a vacuum tube which may be used in the apparatus of the invention, the envelope being partly broken away.

Referring to Figure 1 an electron gun consisting of a cathode 1, cathode shield 2, and anode 3 produces a ribbon type electron beam. The electron beam passes through a first pair of deflecting electrodes $D_1$, $D_2$, which act on the whole length of the electron beam, and then through a second or upper pair of deflecting electrodes $D_3$, $D_4$ and a third or lower pair of deflecting electrodes $D_{3'}$, $D_{4'}$ of which only $D_{4'}$ is visible in Figure 1. The pairs of deflecting electrodes $D_3$, $D_4$ and $D_{3'}$, $D_{4'}$ are similar and are similarly placed with respect to the electron beam with one pair above and longitudinally spaced from the other: these pairs of deflecting electrodes act independently on their sections of the electron beam. The electron beam then passes through a screen grid 4 and the suppressor grid 5. The electron beam is divided into a first or upper section and a second or lower section by a strip 6 across the suppressor grid. The width of this strip is chosen with respect to the spacings between the pairs of deflectors to provide sufficient isolation between the sections. Two divided target electrodes, $T_1$, $T_{1'}$ for the upper section of the electron beam, and $T_2$, $T_{2'}$, of which only $T_2$, is visible in Figure 1, for the lower section, are provided. The target electrodes are divided longitudinally. The division in the lower section is centrally placed, and that in the upper section is off-set, so that with all the deflectors at the same potential the lower section of the electron beam divides centrally between the target parts $T_2$, $T_{2'}$, and the upper section falls wholly on $T_1$. This arrangement, with one longitudinal division centrally placed, and the other off-set, is preferred for simplicity and ease of operation of the tube, but the same result can be achieved, for example, if both targets are centrally divided by appropriately biasing one or more of the second and third pairs of deflecting electrodes $D_3$, $D_4$, $D_{3'}$, $D_{4'}$.

The sensitivity of all the deflectors is made the same and their D. C. level is chosen to be of the same order as that of the target supply voltages, thereby simplifying circuit arrangements and permitting direct links to be made between targets and deflectors.

Figure 2:
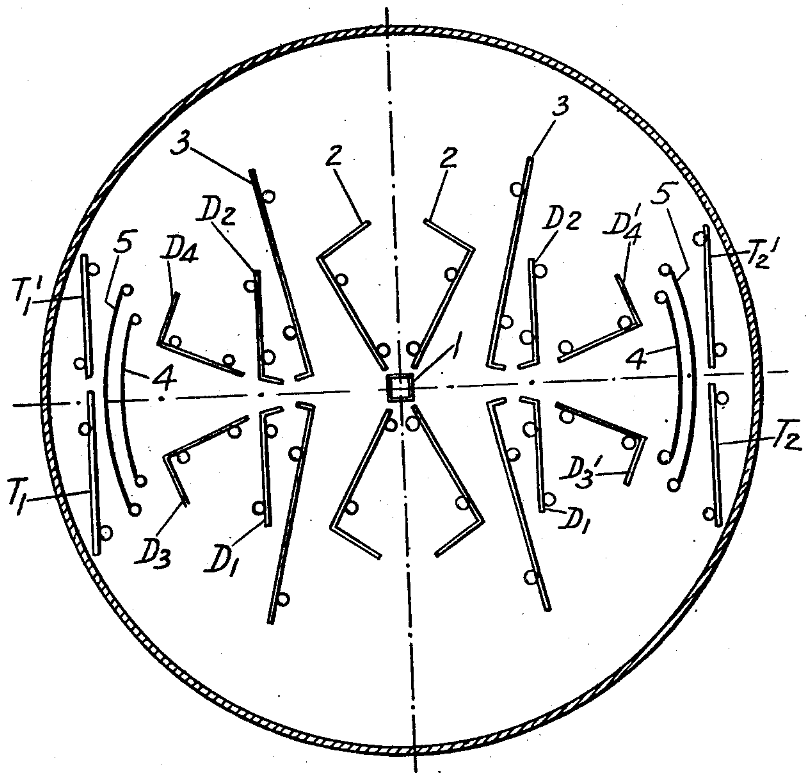
Fig. 2 is a diagrammatic plan view of the electrode arrangement in a back-to-back vacuum tube which may be used in the apparatus of the invention.

It will be noted that each section of the tube consists essentially of two pairs of deflectors and a divided target, with one pair of deflectors made common to both sections. An alternative method of division into sections is shown in plan in Figure 2 where a back-to-back arrangement of electrodes having a common cathode is shown; the electrodes are numbered to correspond with the numbering employed in Figure 1. A further alternative is to build each section in a separate envelope.

Figure 3:
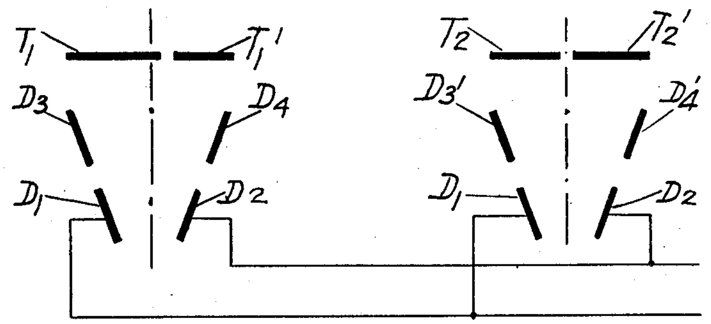
Fig. 3 is a circuit diagram of the vacuum tubes of Figures 1 or 2 showing the manner in which the electrodes are connected.

The operation of the tube will be better understood from Figure 3 which shows diagrammatically the deflecting electrodes and target electrodes only, the centre of the electron beam sections being shown by the dot-dash lines in the position occupied when all deflectors are at the same potential. Each section has four inputs (one to each deflecting electrode) and a divided output target. The signals applied to the deflectors are normally negative voltage pulses. In the notation herein used a positive voltage pulse is indicated by a primed letter. A unit pulse is considered to be one which will shift the beam at the target a distance equal to its width multiplied by a safety factor, and such as to cause, if applied as a negative pulse to either $D_1$ or $D_3$, or as a positive pulse to either $D_2$ or $D_4$, the electron beam for the first section to move from the position shown, where it falls on target part $T_1$, to a position where it falls wholly on target part $T_{1'}$. For the purposes of this invention the signals used can only assume levels which are multiples of a unit pulse.

It may be seen from inspection that the following relations hold for current flow in the targets.

| Output (Target Current) | | Input (Deflectors) | | |
|---|---|---|---|---|
| $i_{T_1}$ | $i_{T_{1'}}$ | | | |
| 1 | 0 | $V_{D1}-V_{D2}+V_{D3}-V_{D4}$ | $0\leq$ | (1) |
| 0 | 1 | $V_{D1}-V_{D2}+V_{D3}-V_{D4}$ | $1\geq$ | (2) |
| $i_{T_2}$ | $i_{T_{2'}}$ | | | |
| 1 | 0 | $V_{D1}-V_{D2}+V_{D3'}-V_{D4'}-\tfrac{1}{2}$ | $\leq$ | (3) |
| 0 | 1 | $V_{D1}-V_{D2}+V_{D3'}-V_{D4'}$ | $\tfrac{1}{2}\geq$ | (4) |

where $$i_{T_1}, i_{T_{1'}}, i_{T_2} \text{ and } i_{T_{2'}}$$

represent the current flow to the target parts $T_1$, $T_{1'}$, $T_2$ and $T_{2'}$ respectively, the numbers 1 and 0 thereunder indicating flow of current and zero current respectively, and $V_{D1}$, $V_{D2}$, $V_{D3}$, $V_{D4}$, $V_{D3'}$ $V_{D4}$, represent unit pulses which may be applied to deflecting electrodes $D_1$, $D_2$, $D_3$, $D_4$, $D_{3'}$, $D_{4'}$ respectively so that in the equations each will have the value 1 if present and zero if not present. Thus when Equation 1 is satisfied, the electron beam falls on target part $T_1$ and current flows to it but none flows to $T_{1'}$, but when Equation 2 is satisfied the reverse is true. Similarly current flows to target part $T_2$ when Equation 3 is satisfied and to target part $T_{2'}$ when Equation 4 is satisfied.

Equations 1 and 2 can be rewritten, assuming appropriate attention to the polarities of the pulses applied to the deflecting electrodes (which may be either positive or negative unit pulses) as $$A+B+C+D\leq 0 \quad (5)$$
$$A+B+C+D\geq 1 \quad (6)$$

and Equations 3 and 4 as $$A+B+C\leq(-\tfrac{1}{2}+D) \quad (7)$$
$$A+B+C\geq(\tfrac{1}{2}+D) \quad (8)$$

where A, B, C, D represent unit pulses which may be applied to appropriate deflecting electrodes.

Figure 4:
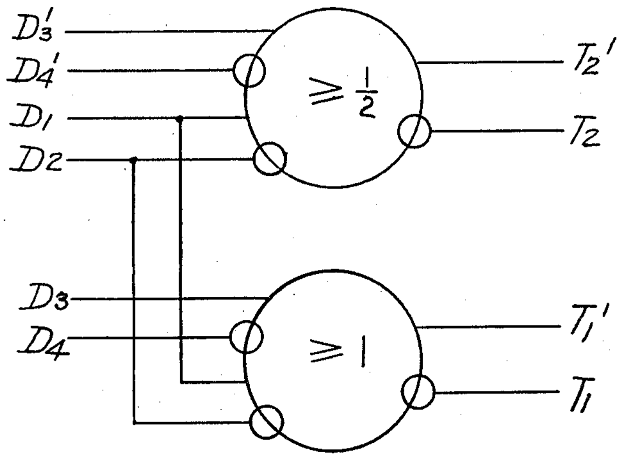
Fig. 4 is a symbolic representation of the circuit of Figure 3.

The relations (1) to (4) may be summarised in the symbol shown in Fig. 4.

Connections to a deflecting electrodes which produce deflection of the electron beams in one direction are shown plain, while connections to deflecting electrodes which produce deflection in the opposite direction are indicated by a small circle surrounding the connection. Plain and circled connections to the parts of the target electrodes are used to distinguish those parts onto which the electron beams are directed by negative pulses applied to similarly marked deflecting electrodes.

The number in the circle indicates the resultant effective value of the unit pulses applied to the deflecting electrodes for a positive current output from target parts $T_{1'}$ and $T_{2'}$, which appears as a negative voltage pulse by including a resistor in series with the appropriate target electrode. This number is determined by the target offset that is the displacement of the division between the target parts from the centre line, when expressed in terms of beam movement per unit pulse input, but it may be altered by a constant voltage difference on any deflector pair: thus by applying an appropriate bias voltage, to say, electrode $D_{4'}$ the number $\geqslant\tfrac{1}{2}$ shown may be altered to say, $\geqslant 0$, $\geqslant 1$, $\geqslant 2$, etc. Thus the number ½ means, if the deflecting electrodes are all at the same potential, that the division between the target parts is displaced from the centre line by one half the displacement caused by a unit pulse applied to any deflecting electrode.

The table for binary addition is shown below using the following notation

X and Y=digits of the input numbers (which must be 0 or 1)

$C_{in}$=carry input resulting from the previous step

S=sum of $X+Y$ $C_{out}$=carry output

| Input | | | Output | |
|---|---|---|---|---|
| X | Y | $C_{in}$ | S | $C_{out}$ |
| 0 | 0 | 1 | 1 | 0 |
| 0 | 1 | 0 | 1 | 0 |
| 1 | 0 | 0 | 1 | 0 |
| 0 | 1 | 1 | 0 | 1 |
| 1 | 0 | 1 | 0 | 1 |
| 1 | 1 | 0 | 0 | 1 |
| 1 | 1 | 1 | 1 | 1 |

Examination of the table verifies that the conditions for sum and carry digits are expressed in binary notation.

$C_{out}$ when $$X+Y+C_{in}=1, 0 \text{ or } 1, 1$$

that is $$X+Y+C_{in}\geqslant 1, 0 \quad (9)$$

and for a sum digit S they are $$X+Y+C_{in}-2C_{out}=0, 1$$

that is $$X+Y+C_{in}-2C_{out}\geqslant 0, 1 \quad (10)$$

These equations should be compared with Equations 4 and 2 respectively. Equation 4 can be rewritten $$V_{D1}-V_{D2}+V_{D3'}\geq\tfrac{1}{2}+V_{D4'}$$
$$\geq 2$$

or in binary notation $V_{D1}-V_{D2}+V_{D3'}\geqslant 1, 0$. Equation 2 in binary notation is $V_{D1}-V_{D2}+V_{D3}-V_{D4}\geqslant 0, 1$ by appropriate choice of the bias voltage (negative with respect to the other electrodes) on electrode $D_{4'}$. Negative pulses corresponding to X and Y can be applied, for example, to electrodes $V_{D1}$ and $V_{D3'}$, and positive pulses corresponding to $C_{in}$ to electrode $D_2$. If negative pulses having twice the unit amplitude and generated when there is a $C_{out}$ are applied to deflecting electrode $D_4$ then Equation 2 satisfies Equation 10.

Figure 5:
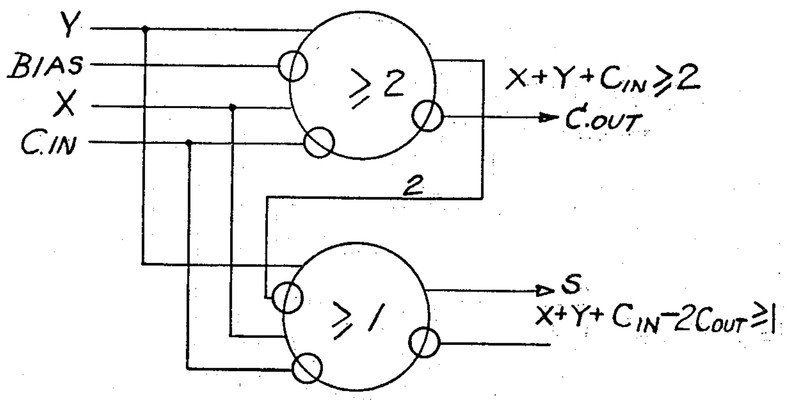
Fig. 5 is a further symbolic representation.

This is shown translated into the symbolic form used hereinbefore in Figure 5.

Figure 6:
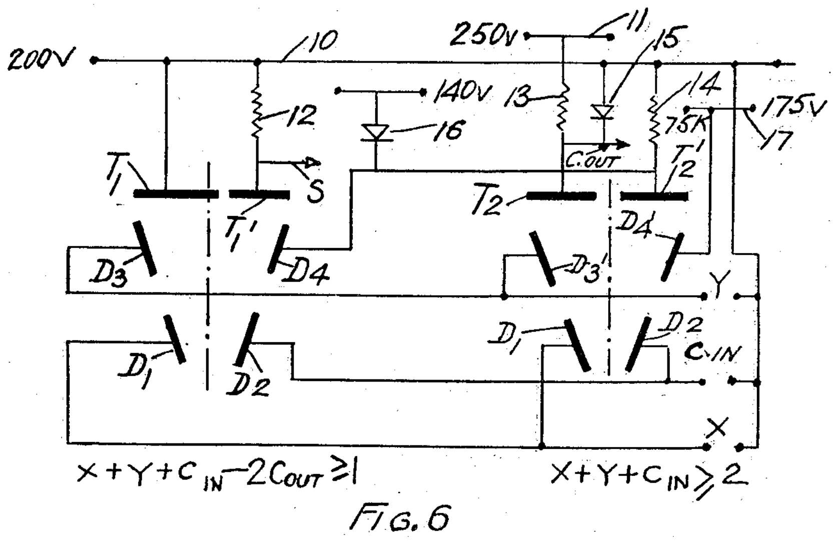
Fig. 6 is a circuit diagram of a binary adder according to the invention.

A complete circuit arrangement is shown in Fig. 6, only the deflecting and target electrodes of the tube being shown. The target electrode parts $T_1$, $T_{1'}$, $T_{2'}$ are returned to a high tension line 10 held at, say, 200 volts positive with respect to the cathode while $T_2$ is returned to another high tension line 11 held at, say, 250 volts. Resistances 12, 13 and 14 are included in the leads to the parts $T_{1'}$, $T_2$, $T_{2'}$. Resistance 14 is made approximately twice that of resistance 13 to give a voltage drop across 14, when the electron beam falls on $T_{2'}$, which is approximately twice that across 13 when the electron beam falls on $T_2$. The crystal diode 15 holds the target part $T_2$ at 200 volts when the electron beam falls on $T_2$, and crystal diode 16 holds the voltage drop across resistance 12 to twice the value of the pulse input to deflecting electrodes $D_1$, $D_2$, $D_3$, $D_{3'}$. Negative input pulses of unit amplitude corresponding to the digits X and Y are applied between the positive line 10 and the electrodes $D_1$, $D_3$ and $D_{3'}$ as shown, and positive input pulses of unit amplitude corresponding to a carry-in digit, and obtained from the carry out electrode of a similar arrangement employed for the digit of next less significance, are applied at $C_{in}$. Deflecting electrode $D_{4'}$ is returned to a high tension line 17, in this case held at about 175 volts, to bias the second part of the electron beam so that it wholly falls on target part $T_2$, and requires unit pulses applied to at least two of the electrodes $D_1$, $D_2$, $D_{3'}$ to transfer it to the target part $T_{2'}$. A unit negative pulse applied to either of electrodes $D_1$, $D_3$, or a positive unit pulse applied to electrode $D_2$, will transfer the first section of the electron beam from $T_1$ to $T_{1'}$ unless the second part of the electron beam has been transferred to target part $T_{2'}$: if the second part of the electron beam has been transferred to target part $T_{2'}$ then negative unit pulses must appear on deflecting electrodes $D_1$ and $D_3$ simultaneously with a positive unit pulse on $D_2$ before the first section of the electron beam is transferred to target part $T_{1'}$, to give a sum output. The sum output S is taken from target part $T_{1'}$ since a negative pulse is required for S; in this case target part $T_1$ is not essential, but if a positive pulse output for S was required for any purpose it could be taken from $T_1$ by inserting a resistance between it and the line 10. The carry-out output is taken from target part $T_2$ since in this case a positive pulse output is required for application to the next stage; if a negative pulse had been required it would have been taken from resistance 14 which in such case would have been centre-tapped to provide both the carry-out output $C_{out}$ and also the pulse $2C_{out}$ for application to deflecting electrode $D_4$. Spurious results in the sum digit can occur during the very short period of rise and fall of the various inputs, but this does not cause complications in practice since in a computer the results are always read into a storage device whose input gates are closed during the transient periods.

Figure 7:
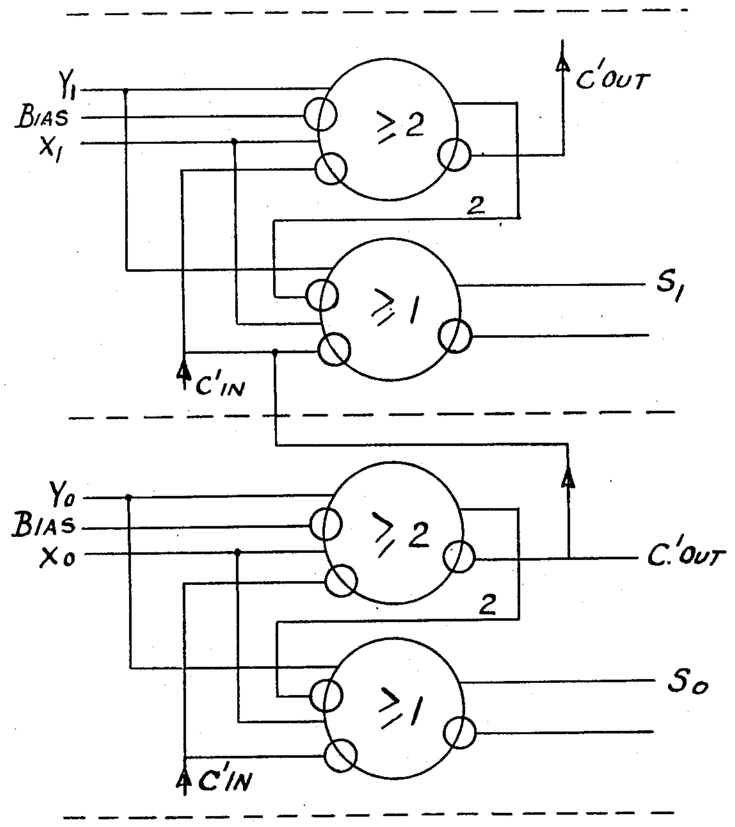
Fig. 7 is a symbolic representation of a parallel adder for two binary digits.

In the case of parallel binary addition, where separate lines are used for each digit of a number, it is necessary only to connect the $C_{out}$ electrode of one stage to the $C_{in}$ deflecting electrode of the stage of next higher significance. A two digit parallel adder is shown in Fig. 7 using the symbolic notation for the two stages. The subscripts 0 and 1 indicate stages for digits of lesser and next succeeding higher significance respectively.

Figure 8:
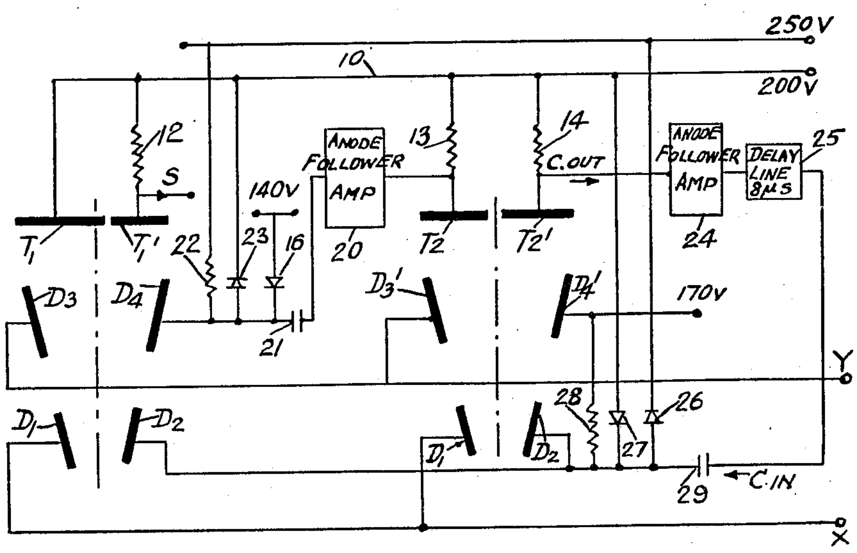
Fig. 8 is a circuit diagram of a serial binary adder.

In the case of serial binary addition, where the digits of the numbers are applied in time sequence, it is necessary to delay the $C_{out}$ pulses one digit period to provide the $C_{in}$ pulses for the next succeeding digit pulses. A circuit designed for operation at 120 kc./s. with 5 microsecond pulses is shown in Fig. 8. The digit pulses are applied in time sequence at X and Y, and the sum output for each pair of digits (after allowance for the carry-in digit if any from the previous pair of digits) appears at S from whence it is applied to any known form of storage means. In Fig. 8 the same reference numerals are used, so far as possible, as in Fig. 6. An anode follower and amplifying valve 20 is included in the feedback link from $T_2$ to $D_4$ to reduce transient errors, and is coupled to $D_4$ by an isolating condenser 21. The upper D. C. level of deflecting electrode $D_4$ is held by resistance 22 and diode 23. The $C_{out}$ output from resistance target part $T_{2'}$ is amplified in the anode follower amplifier 24 and delayed 8$\mu$ S by a delay line 25 before being applied as a carry-in pulse to deflecting electrodes $D_2$. The upper and lower D. C. levels of electrodes $D_2$ are held by diodes 26, 27 the electrodes being connected to the 170 volt bus line by resistance 28.

The table for binary subtraction is shown below using the following notation.

X and Y= digits of the input numbers
$C_{in}$=borrow input resulting from the previous step
D=difference $X-Y$
$C_{out}$=borrow output

| Input | | | Output | |
|---|---|---|---|---|
| X | Y | $C_{in}$ | D | $C_{out}$ |
| 0 | 0 | 1 | 1 | 1 |
| 0 | 1 | 0 | 1 | 1 |
| 0 | 1 | 1 | 0 | 1 |
| 1 | 1 | 1 | 1 | 1 |
| 1 | 0 | 0 | 1 | 0 |
| 1 | 1 | 0 | 0 | 0 |
| 1 | 0 | 1 | 0 | 0 |

Examination of this table shows that the conditions in binary notation for difference and borrow output digits to be produced are $C_{out}$ when $$X-Y-C_{in}=-0,\ 1 \text{ or } -1,\ 0$$

that is (11)

$$X-Y-C_{in}\leqslant-0,\ 1 \text{ or } -X+Y+C_{in}\geqslant 0,\ 1$$

and for a difference digit $$X-Y-C_{in}+2C_{out}=0,\ 1$$

that is $$X-Y-C_{in}+2C_{out}\geqslant 0,\ 1 \qquad (12)$$

These equations may be compared with Equations 3 and 2 respectively. Equation 3 may be rewritten $$V_{D1}-V_{D2}-V_{D4'}\leq-(\tfrac{1}{2}-V_{D3'})$$
$$\leq -1$$

or in binary notation $V_{D1}-V_{D2}-V_{D4'}\leqslant 0,\ 1$ by appropriate choice of the bias voltage on deflecting electrode $D_{3'}$. Negative pulses corresponding to digits X and Y can be applied, for example, to electrodes $D_1$ and $D_{4'}$, and negative pulses corresponding to digits $C_{in}$ to electrode $D_2$. If negative pulses having twice the unit amplitude and generated when there is a $C_{out}$ are applied to deflecting electrode $D_3$ (and X, Y and $C_{in}$ are applied to electrodes $D_1$, $D_4$ and $D_2$ respectively), then Equation 2 satisfies Equation 12.

Figure 9:
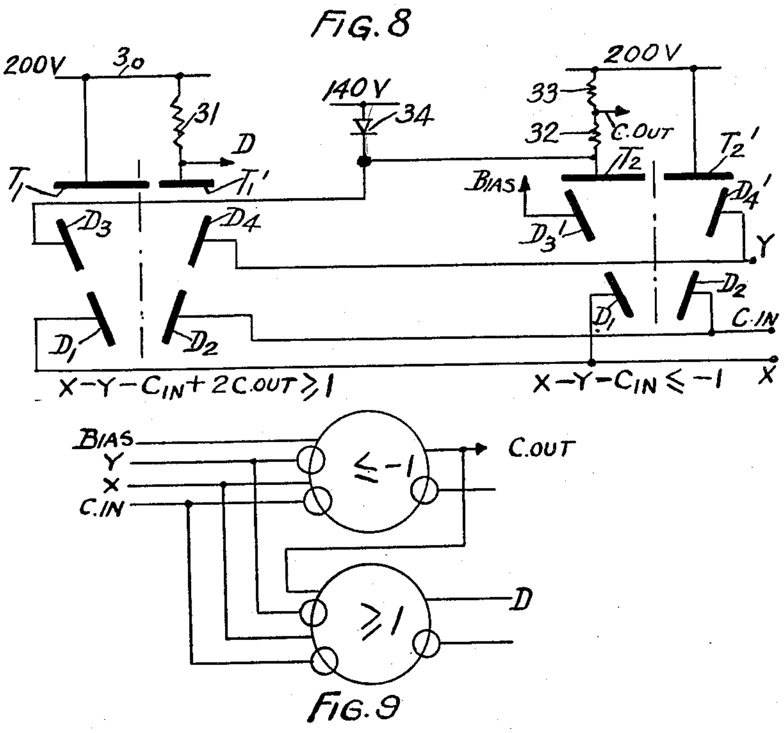
Fig. 9 is a circuit diagram of a binary subtractor with its symbolic representation.

A complete circuit arrangement is shown in Fig. 9, only the target and deflecting electrodes of the tube being shown. The target electrode parts $T_1$, $T_{1'}$, $T_2$, $T_{2'}$ are returned to a high tension line 30 held at, say 200 v. positive with respect to the cathode. Resistance 31 is included in the lead to part $T_{1'}$ and a series connection of equal resistances 32, 33 is included in the lead to target part $T_2$. When the electron beam of the second part of the tube falls on target part $T_2$ the voltage drop across the series connection of 32, 33 would be somewhat greater than twice the unit pulse amplitude in the absence of diode 34 but is held at twice that value by returning the diode to a 140 volt bus line. Negative input pulses of unit amplitude corresponding to the digits X and Y are applied between the positive line 30 and the electrodes $D_1$ and $D_4$, $D_{4'}$ respectively, and negative input pulses of unit amplitude corresponding to the borrow-in digit $C_{in}$, and obtained from the borrow-out electrode of a similar unit employed for digits of next less significance, are applied to electrodes $D_2$. Deflecting electrode $D_{3'}$ is returned to a bias supply to bias the second part of the electron beam so that it wholly falls on target part $T_{2'}$ and requires a unit negative pulse on either of electrodes $D_2$, $D_{4'}$ (in the absence of a pulse applied to $D_1$) to transfer it to part $T_2$. The symbolic representation of this arrangement is shown immediately below the circuit diagram.

The circuit of Fig. 9 can be used in parallel and serial subtraction arrangements in the same manner as described for the adding arrangement of Fig. 6.

It will be noted that the simultaneous equations for both adding and subtracting take the general form $$X+Y+C_{in} \geqslant n$$
$$X+Y+C_{in}+2C_{out} \geqslant 0,\ 1$$

where X and Y represent binary digits (positive or negative), $C_{in}$ represents a binary digit (positive or negative) resulting from similar operations on digits of next lower significance, and $C_{out}$ represents a binary digit (positive or negative) of immediately higher significance resulting from the operation, and $n$ is 0, 1 or 1, 0. These equations are of the same form as Equations 8 and 6 respectively.

What is claimed is:

1. Apparatus for effecting simultaneously the two algebraic operations on binary digits which can be represented by the equations $$X+Y+C_{in} \geqslant n$$
$$X+Y+C_{in}+2C_{out} \geqslant 0,\ 1$$

where X and Y represent binary digits (positive or negative), $C_{in}$ represents a binary digit (positive or negative) resulting from similar operations on digits of immediately lower significance, $C_{out}$ represents a binary digit (positive or negative) of immediately higher significance resulting from the operation, and $n$ is a binary number selected from 0, 1 and 1, 0, comprising means for forming a first beam of electrons, four deflecting electrodes for the first beam arranged to produce deflection of the beam in the same direction (disregarding sense), a target electrode for the first beam, means for forming a second beam of electrons, four deflecting electrodes for the second beam arranged to produce deflection of the beam in the same direction (disregarding sense), a target electrode for the second beam, all deflecting electrodes for the first and second beams having substantially the same deflection sensitivity, means for applying pulses of given amplitude corresponding to the digit X to a first of the deflecting electrodes for the first beam and to a first of the deflecting electrodes for the second beam, means for applying pulses of said given amplitude corresponding to the digit Y to a second of the deflecting electrodes for the first beam and to a second of the deflecting electrodes for the second beam, means for applying pulses of said given amplitude corresponding to the digit $C_{in}$ to a third of the deflecting electrodes for the first beam and to a third of the deflecting electrodes for the second beam, the said given amplitude and the operating potentials being so selected and the polarities of the pulses being so chosen with regard to the deflecting electrodes to which they are applied and the signs of the symbols in the above equations, that the target electrode for the second beam gives a "carry-out" pulse only when the first equation above is satisfied, means for obtaining a second carry-out pulse having an amplitude whose magnitude is twice the given amplitude and applying it to the fourth of the deflecting electrodes for the first beam, whereby the target electrode for the first beam of electrons gives an output pulse only when the second equation above is satisfied.

2. Apparatus as claimed in claim 1 for use in serial computing wherein the "carry-out" pulses from an operation are applied with a time delay of one digit period as the "carry-in" pulses for operations on the digits of next higher significance.

3. A parallel binary adder employing a plurality of apparatus as claimed in claim 1, one apparatus for each digit of the largest binary number to be added, wherein the "carry-out" output from the apparatus for a particular digit is applied as the "carry-in" input for the apparatus for the next more-significant digit.

4. Apparatus as claimed in claim 1 including a single rectangular electron beam, and means for dividing the said single beam before it reaches the target electrodes to form the said first and second beam of electrons, said last mentioned means including a solid plate secured to a suppressor grid at a level between the said targets for the said first and second beams.

5. Apparatus for effecting simultaneously the two algebraic operations on binary digits which can be represented by the equations $$X+Y+C_{in} \geqslant n$$
$$X+Y+C_{in}+2C_{out} \geqslant 0,\ 1$$

where X and Y represent binary digits (positive or negative), $C_{in}$ represents a binary digit (positive or negative) resulting from similar operations on digits of immediately lower significance, $C_{out}$ represents a binary digit (positive or negative) of immediately higher significance resulting from the operation, and $n$ is a binary number selected from 0, 1 and 1, 0, comprising means for forming a first beam of electrons, a first pair of deflecting electrodes for the beam, a second pair of deflecting electrodes for deflecting the beam in the same directions as the first pair of deflecting electrodes, a target electrode positioned so that the electron beam does not fall on it when normal operating potentials are applied to the deflecting electrodes but a pulse of given amplitude and appropriate polarity applied to any of the said deflecting electrodes moves the electron beam onto the target, means for forming a second beam of electrons, a first pair of deflecting electrodes for said second beam, a second pair of deflecting electrodes for deflecting the said second beam in the same directions as the first pair of deflecting electrodes therefor, a target electrode for the second beam, all deflecting electrodes for the first and second beams having substantially the same deflection sensitivity, means for applying pulses of said given amplitude corresponding to the digit X to one of the said deflecting electrodes for the first beam and to one of the said deflecting electrodes for the second beam, means for applying pulses of said given amplitude corresponding to the digit Y to a second of the said deflecting electrodes for the first beam and to a second of the said deflecting electrodes for the second beam, means for applying pulses of said given amplitude corresponding to the digit $C_{in}$ to a third of the said deflecting electrodes for the first beam and to a third of the said deflecting electrodes for the second beam, means for biasing the remaining deflecting electrode of the second beam so that the target electrode thereof does not give an output pulse unless and until substantially simultaneous pulses of said given amplitude are applied to at least $n$ deflecting electrodes for the second beam, means for applying a pulse equal in amplitude to twice the said given amplitude to the remaining deflecting electrode for the first beam when an output pulse is obtained from the target for the second beam, an output terminal connected to the first target electrode, and a carry-out terminal connected to the target elecrode of the second beam.

6. Apparatus as claimed in claim 5 wherein the said first and second beams of electrons consist of oppositely directed electron beams formed in the one envelope from a common cathode.

7. Apparatus for effecting simultaneously the two algebraic operations on binary digits which can be represented by the equations $$X+Y+C_{in} \geqq n$$
$$X+Y+C_{in}+2C_{out} \geqq 0,\ 1$$

where X and Y represent binary digits (either positive or negative), $C_{in}$ represents a binary digit (positive or negative) resulting from similar operations on digits of immediately lower significance, $C_{out}$ represents a binary digit (positive or negative) of immediately higher significance resulting from the operation, and $n$ is a binary number selected from 0, 1 and 1, 0 comprising a beam deflection electron vacuum tube including a cathode, means for forming a beam of electrons, a first pair of deflecting electrodes, means for dividing the electron beam into two sections, a pair of deflecting electrodes for the first of said sections, a pair of deflecing electrodes for the second of said sections, a first target electrode for the said first section positioned so that the electron beam does not fall on it when normal operating potentials are applied to the deflecting electrodes but a pulse of given amplitude of appropriate polarity applied to any of the first pair of deflecting electrodes and the deflecting electrodes of the first section moves the said first section of the electron beam onto the said first target, a second target electrode for the said second section, means for applying pulses of said given amplitude corresponding to the digit X to one of the said first pair of deflecting electrodes, means for applying pulses of said given amplitude corresponding to the digit Y to one electrode of the pair of deflecting electrodes for the said first section and to one electrode of the pair of deflecting electrodes for the said second section, means for applying pulses of said given amplitude corresponding to the digit $C_{in}$ to the other of the said first pair of deflecting electrodes, means for biasing the remaining electrode of the said deflecting electrode of the second section so that the target electrode of the second section does not give an output pulse $C_{out}$ unless and until simultaneous pulses of said given amplitude are applied to at least $n$ electrodes of the said first pair and the said first electrode of the second section, means for applying a pulse equal in amplitude to twice the said given amplitude to the remaining deflecting electrode of the pair of deflecting electrodes of the said first section when an output pulse $C_{out}$ is obtained from the said second target, an output terminal connected to the first target electrode, and a carry-out terminal connected to the second target electrode.

8. A parallel binary operation employing a plurality of the apparatuses claimed in claim 7, one apparatus for each digit of the greater of the numbers (X0, X1—X$l$) and (Y0, Y1—Y$m$), wherein the carry-out output from the apparatus for a digit is applied to the said other of the said first pair of deflecting electrodes of the apparatus for the next more significant digit.

9. Apparatus as claimed in claim 7 for use in serial computing wherein the output pulses $C_{out}$ are delayed by a digit period and applied as the pulses corresponding to the digit $C_{in}$.

10. Apparatus for effecting binary addition of single binary digits comprising a beam deflection electron vacuum tube including a cathode, means for generating a beam of electrons, a first pair of deflecting electrodes, means for dividing the electron beam into two sections, a pair of deflecting electrodes for the first of said sections, a pair of deflecting electrodes for the second of said sections, a target electrode for the first of said sections positioned so that the electron beam does not fall on it when all deflecting electrodes are at the same potential, a divided target electrode for the second of said sections, resistances connected between the target electrodes and a high tension source, means for applying pulses of one polarity corresponding to a first number to be added to one deflecting electrode of the first pair, means for applying pulses of the said one polarity corresponding to a second number to be added to those ones of the said pairs of deflecting electrodes for the said first and second sections which effect deflection in the same direction and sense as that deflecting electrode to which the first mentioned pulses are applied, means for applying pulses of opposite polarity corresponding to a "carry-in" number to the second of the said first pair of deflecting electrodes, means for applying a bias potential to the remaining deflecting electrode of the said second section to cause the second section of the electron beam to fall on one part of the divided target, a connection between the remaining deflecting electrode of the said first section and the other part of the divided target electrode whereby a pulse of twice the amplitude applied to the other deflecting electrodes is applied to the last-mentioned remaining deflecting electrode when the said second section of the electron beam falls on the said other part of the divided target, a sum output electrode connected to the target electrode of the first section, and a "carry-out "output electrode connected to the said one part of the divided target electrode of the second section.

11. Apparatus for effecting addition of two binary digits X and Y comprising a beam deflection electron vacuum tube including a cathode, means for generating a beam of electrons, a first pair of deflecting electrodes $D_1$ and $D_2$, means for dividing the electron beam into two sections, a pair of deflecting electrodes $D_3$ and $D_4$ for the first of said sections, a pair of deflecting electrodes $D_{3'}$ and $D_{4'}$ for the second of said sections, all odd-numbered deflecting electrodes producing deflections in one direction and all even numbered deflecting electrodes producing deflection in the opposite direction for similarly poled potentials applied thereto, a first target electrode $T_1$ for the said first section positioned so that the electron beam does not fall on it when all deflecting electrodes are at the same potential, but a pulse of given amplitude of appropriate polarity applied to any deflecting electrodes $D_1$, $D_2$, $D_3$ and $D_4$ brings the said first section of the electron beam on the target, a divided second target electrode having parts $T_2$ and $T_{2'}$ for the second of the sections, resistances connected betwen the target electrodes and a high tension source, means for applying pulses of one polarity and of said given amplitude corresponding to the first digit X to deflecting electrode $D_1$, means for applying pulses of said one polarity and of said given amplitude corresponding to the second digit Y to deflecting electrodes $D_3$ and $D_{3'}$, means for applying pulses of opposite polarity and of said given amplitude corresponding to a "carry-in" number to deflecting electrodes $D_2$, means for biasing deflecting electrode $D_{4'}$ so that the second section of the electron beam falls on part $T_2$ of the second target and requires simultaneous pulses of said given amplitude on at least two of the deflecting electrodes $D_1$, $D_2$ and $D_{3'}$ to move it onto part $T_{2'}$ of the second target, a connection between the part $T_{2'}$ of the second target electrode and the deflecting electrode $D_4$ whereby a pulse of substantially twice the given amplitude is applied to the electrode $D_4$ when the said second section of the electron beam falls on said part $T_{2'}$, a sum output terminal connected to the said first target electrode $T_1$, and a "carry-out" output terminal connected to the part $T_2$ of the second target electrode.

12. A parallel binary adder employing a plurality of apparatuses as claimed in claim 11, one apparatus for each digit of the largest binary number to be added, wherein the "carry-out" output from the apparatus for a particular digit is applied to the deflecting electrode $D_2$ of the apparatus for the next more significant digit.

13. Apparatus as claimed in claim 11 for use in serial computing wherein the "carry-out" output pulses are amplified, delayed by a digit period, clipped and applied as the "carry-in" impulses to deflecting electrodes $D_2$.

14. Apparatus for effecting subtraction of a binary digit Y from a binary digit X comprising a beam deflection electron vacuum tube including a cathode, means for generating a beam of electrons, a first pair of deflecting electrodes $D_1$ and $D_2$, means for dividing the electron beam into two sections, a pair of deflecting electrodes $D_3$ and $D_4$ for the first of said sections, a pair of deflecting electrodes $D_{3'}$ and $D_{4'}$ for the second of said sections, all odd-numbered deflecting electrodes producing deflection in one direction and all even numbered deflecting electrodes producing deflection in the opposite direction for similarly poled potentials applied thereto, a first target electrode for the said first section positioned so that the electron beam does not fall on it when all deflecting electrodes are at the same potential but a pulse of given amplitude of appropriate polarity applied to any deflecting electrode $D_1$, $D_2$, $D_3$ and $D_4$ brings the said first section of the electron beam on the target a second target electrode for the second of said sections, resistances connected between the target electrodes and a high tension source, means for applying pulses of one polarity and of said given amplitude corresponding to the digit X to deflecting electrode $D_1$, means for applying pulses of said one polarity and of said given amplitude corresponding to the digit Y to deflecting electrodes $D_4$ and $D_{4'}$, means for applying pulses of said one polarity and of said given amplitude corresponding to a "borrow" digit to deflecting electrode $D_2$, means for biasing deflecting electrode $D_{3'}$ so that the second section of the electron beam does not fall on the said second target electrode and in the absence of a pulse on $D_1$, requires a pulse of said given amplitude and polarity on at least one of the electrodes $D_2$ and $D_{4'}$, and in the presence of a pulse of said given amplitude and polarity on $D_1$ requires pulses of said given amplitude and polarity on both electrodes $D_2$ and $D_{4'}$ to move it onto the said second target electrode, a connection between the said second target electrode and the deflecting electrode $D_3$ whereby a pulse of substantially twice the given amplitude is applied to the electrode $D_3$ when the said second section of the electron beam falls on said second target electrode, a difference output terminal connected to the first target electrode, and a "borrow-out" terminal connected to the said second target electrode.

15. A parallel binary subtractor employing a plurality of apparatuses as claimed in claim 14 one apparatus for each digit of the minuend, wherein the "borrow-out" output from the apparatus for a digit is applied to the deflecting electrode $D_2$ of the apparatus for the next more significant digit.

16. Apparatus for effecting binary addition of binary digits comprising means for forming a first beam of electrons, a first pair of deflecting electrodes for the beam, a second pair of deflecting electrodes for deflecting the beam in the same directions as the first pair of deflecting electrodes, a target electrode for the first beam, means for forming a second beam of electrons, a first pair of deflecting electrodes for the said second beam, a second pair of deflecting electrodes for deflecting said second electron beam in the same directions as the first pair of deflecting electrodes therefor, a target electrode for the said second beam, all deflecting electrodes for the first and second beams having substantially the same deflection sensitivity, means for applying unit pulses corresponding to the first digit to be added to one of the said deflecting electrodes for the first beam and to one of the said deflecting electrodes for the second beam, means for applying unit pulses corresponding to a second digit to be added to a second of the said deflecting electrodes for the first beam and to a second of the said deflecting electrodes for the second beam, means for applying unit pulses corresponding to a "carry-in" digit to a third of said deflecting electrodes for the first beam and to a third of the said deflecting electrodes for the second beam, the polarities of the unit pulses being so chosen with respect to the deflecting electrodes to which they are applied and the operating potentials being such that, in the case of the first beam of electrons a unit pulse applied to any one of the said three deflecting electrodes therefor will move the electron beam to produce an output pulse on its target electrode, in the case of the second beam of electrons the unit pulses will tend to move the electron beam so that the target electrode thereof will give a "carry-out" output pulse only when the unit pulses are applied substantially simultaneously to at least two of the said three deflecting electrodes for the second electron beam, means for obtaining a second output pulse having an amplitude of twice that of a unit pulse and for applying it to the remaining deflecting electrode for the first beam of electrons with a polarity such as to allow a "sum" output pulse from the target electrode for the first electron beam only when unit pulses are applied substantially simultaneously to the other three deflecting electrodes therefor.

17. Apparatus as claimed in claim 16 wherein the said first beam of electrons does not fall on its target electrode when normal operating potentials are applied to its electrodes, but unit pulses applied to any one of the first three-mentioned deflecting electrodes for the said first beam of electrons will in the absence of a pulse applied to the fourth or remaining deflecting electrode therefor move it onto the said last-mentioned target electrode, and wherein the said target electrode for the second beam of electrons is divided and the fourth or remaining deflecting electrode therefor is so biased that it falls wholly on one part only of the divided target electrode and is moved onto the other part of the divided target electrode when unit pulses are applied to at least two of the other deflecting electrodes.

18. Apparatus as claimed in claim 17 wherein the pulses corresponding to the first digit are applied as negative pulses to one of the said first pair of deflecting electrodes for the first electron beam and to a corresponding deflecting electrode for the second electron beam, the pulses corresponding to the second digit are applied as negative pulses to that one of the said second pair of deflecting electrodes for the first electron beam which produces deflection in the same direction as the said one of the said first pair and to a corresponding deflecting electrode for the second electron beam, the pulses corresponding to the "carry-in" digit are applied as positive pulses to the other of the said first pair of deflecting electrodes for the first electron beam and to a corresponding electrode for the second electron beam, and the said pulses of amplitude double that of a unit pulse are applied as negative pulses to the other deflecting electrode for the said second pair of deflecting electrodes for the first electron beam.

19. Apparatus for effecting binary subtraction of a binary digit Y from a binary digit X comprising means for forming a first beam of electrons, a first pair of deflecting electrodes for the beam, a second pair of deflecting electrodes for deflecting the beam in the same directions as the first pair of deflecting electrodes, a target electrode for the first beam, means for forming a second beam of electrons, a first pair of deflecting electrodes for the said second beam, a second pair of deflecting electrodes for deflecting said second electron beam in the same directions as the first pair of deflecting electrodes therefor, all deflecting electrodes for the first and second beams having substantially the same deflection sensitivity, means for applying unit pulses corresponding to the digit X to one of the said deflecting electrodes for the first beam and to one of the said deflecting electrodes for the second beam, means for applying unit pulses corresponding to the digit Y to a second of the said deflecting electrodes for the first beam and to a second of the said deflecting electrodes for the second beam, means for applying unit pulses corresponding to a "borrow" or "carry-in" digit to a third of said deflecting electrodes for the first electron beam and to a third of the said deflecting electrodes for the second beam, the polarities of the unit pulses being so chosen with respect to the deflecting electrodes for the said second electron beam and the operating potentials being such that, in the absence of a unit pulse corresponding to the digit X unit pulses on at least one of the said two other deflecting electrodes for the second electron beam, and in presence of a pulse corresponding to the digit X unit pulses on both the said two other deflecting electrodes for the second electron beam, produce a unit "carry-out" pulse from the target electrode for the second electron beam, means for obtaining a second "carry-out" pulse of double the amplitude of that of a unit pulse, means for applying the last-mentioned double amplitude pulse to the remaining deflecting electrode for the said first beam of electrons, the polarities of the unit pulses and the double amplitude pulse being so chosen with respect to the deflecting electrodes to which they are applied and the operating potentials being such that the target electrode for the first electron beam gives a "difference" output pulse only if the arithmetic sum of the pulses applied to the deflecting electrodes corresponding to the digit X and the said double amplitude pulse is greater by at least one than the arithmetic sum of the pulses applied to the deflecting electrodes corresponding to the digit Y and the "carry-in" digit.

20. Apparatus for effecting addition of binary digits X and Y comprising a cathode ray beam tube including a cathode, means for generating two electron beams, four deflecting electrodes for the first beam arranged to produce deflection of the beam in the same direction (disregarding sense), four deflecting electrodes for the second beam arranged to produce deflection of the beam in the same direction (disregarding sense), all deflecting electrodes having substantially the same deflection sensitivity, separate target electrodes for the two electron beams, means for applying unit pulses corresponding to a digit X to first deflecting electrodes for both electron beams, means for applying unit pulses corresponding to a digit Y to second deflecting electrodes for both electron beams, means for applying unit pulses corresponding to a "carry-in" digit to third deflecting electrodes for both electron beams, the potentials applied to the electrodes for the second electron beam being such and the polarities of the unit pulses being so chosen with respect to the deflecting electrodes to which they are applied that the target electrode of the second beam gives a "carry-out" pulse only when unit pulses are applied substantially simultaneously to at least two of the said three deflecting electrodes for the second beam, means for obtaining a second "carry-out" pulse of double the amplitude of a unit pulse and applying it to the fourth deflecting electrode for the first electron beam, the potentials applied to the electrodes for the first electron beam being such and the polarities of the pulses being so chosen with respect to the deflecting electrodes to which they are applied that the target electrode for the first beam gives a "sum" output pulse only (*a*) if no said second "carry-out" pulse is applied to the said fourth deflecting electrode, when a unit pulse is applied to any one or unit pulses are applied substantially simultaneously to more than one of the said three first-mentioned deflecting electrodes for the first electron beam, or (*b*) if the said second "carry-out" pulse is applied to the said fourth deflecting electrode, when unit pulses are applied substantially simultaneously to all said three first-mentioned deflecting electrodes for the first beam.

21. Apparatus as claimed in claim 20 wherein the said deflecting electrodes are arranged in pairs, the pulses corresponding to the digit X are applied as negative pulses to one electrode of a first pair of deflecting electrodes for the first beam and to a corresponding deflecting electrode for the second beam, the pulses corresponding to the digit Y are applied as negative pulses to a similarly positioned deflecting electrode of the second pair for the first beam and to a corresponding deflecting electrode for the second beam, the pulses corresponding to the "carry-in" digit are applied as positive pulses to the others of the said first pairs of deflecting electrodes, and the said second "carry-out" pulse is applied as a negative pulse to the remaining deflecting electrode for the first electron beam.

22. Apparatus for effecting subtraction of a binary digit Y from a binary digit X comprising a cathode ray beam tube including a cathode, means for generating two electron beams, four deflecting electrodes for the first beam arranged to produce deflection of the beam in the same direction (disregarding sense), four deflecting electrodes for the second beam arranged to produce deflection of the beam in the same direction (disregarding sense), all deflecting electrodes having substantially the same deflection sensitivity, separate target electrodes for the two electron beams, means for applying unit pulses corresponding to the digit X to first deflecting electrodes for both electron beams means for applying unit pulses corresponding to the digit Y to second deflecting electrodes for both electron beams, means for applying unit pulses corresponding to a "carry-in" digit to third deflecting electrodes for both electron beams, the potentials applied to the electrodes for the second electron beam being such and the polarities of the unit pulses being so chosen with respect to the deflecting electrodes to which they are applied that the target electrode of the second beam gives a "carry-out" pulse only, (*a*) if there is no unit pulse corresponding to the digit X, when unit pulses corresponding to one or both the digit Y and for the "carry-in" digit are applied to the deflecting electrodes, and (*b*) if there is a unit pulse corresponding to the digit X, when unit pulses corresponding to both the digit Y and the "carry-in" digit are applied substantially simultaneously to the deflecting electrodes, means for obtaining a second "carry-out" pulse of double the amplitude of a unit pulse and applying it to the fourth deflecting electrode for the first electron beam, the potentials applied to the electrodes for the first electron beam being such and the polarities of the pulses being so chosen with respect to the deflecting electrodes to which they are applied that the target electrode for the first electron beam gives a "difference" output pulse only if the arithmetic sum of the pulses applied to the deflecting electrodes corresponding to the digit X and the said second "carry-out" pulse is greater by at least one than the arithmetic sum of the pulses applied to the deflecting electrodes corresponding to the digit Y and the "carry-in" digit.

23. Apparatus as claimed in claim 22 wherein the said deflecting electrodes are arranged in pairs, the pulses corresponding to the digit X are applied as negative pulses to one electrode of a first pair of deflecting electrodes for the first beam and to a corresponding deflecting electrode for the second beam, the pulses corresponding to the digit $C_{in}$ are applied as negative pulses to the opposing members of the said first pairs of electrodes, the pulses corresponding to the digit Y are applied as negative pulses to those of the second pairs of deflecting electrodes which correspond to the electrodes of the first pairs to which the pulses corresponding to the digit $C_{in}$ are applied, and the said second "carry-out" pulses are applied as negative pulses.

24. Apparatus for effecting addition of binary digits in a serial computor comprising means for generating a first beam of electrons, a first pair of deflecting electrodes $D_1$ and $D_2$, a second pair of deflecting electrodes $D_3$ and $D_4$, all odd-numbered deflecting electrodes producing deflections in one direction and all even-numbered deflecting electrodes producing deflections in the opposite direction for similarly poled potentials applied thereto, a target electrode $T_1$ positioned so that the electron beam does not fall on it when all deflecting electrodes are at the same potential but a pulse of given amplitude and appropriate polarity applied to any deflecting electrode brings the electron beam on the target electrode, means for generating a second beam of electrons, a first pair of deflecting electrodes $D_{1'}$, $D_{2'}$ for the second beam, a second pair of deflecting electrodes $D_{3'}$, $D_{4'}$ for the second beam, odd-numbered deflecting electrodes $D_{1'}$ and $D_{3'}$ producing deflections in one direction and even-numbered deflecting electrodes $D_{2'}$ and $D_{4'}$ producing deflections in the opposite direction for similarly poled potentials applied thereto, a divided target electrode having parts $T_2$ and $T_{2'}$ for the second electron beam, resistances connected between the target electrodes and a high tension source, means for applying pulses of one polarity and of said given amplitude corresponding to a first binary digit to deflecting electrodes $D_1$ and $D_{1'}$, means for applying pulses of said one polarity and of said given amplitude corresponding to a second binary digit to deflecting electrodes $D_3$ and $D_{3'}$, an amplifier whose input is connected to target electrode part $T_2$ and whose output after clipping is applied to deflecting electrode $D_4$ as pulses having twice the given amplitude and being of said one polarity, an amplifier whose input is connected to the target electrode part $T_{2'}$, and whose output is delayed in time a digit period and after clipping is applied as pulses of opposite polarity and of said given amplitude to deflecting electrodes $D_2$ and $D_{2'}$, means for biasing deflecting electrode $D_{4'}$, so that the aforesaid pulses from target electrode parts $T_2$ and $T_{2'}$ are not obtained unless simultaneous pulses of said given amplitude appear on at least two of the deflecting electrodes $D_{1'}$ $D_{2'}$ and $D_{3'}$, a sum output terminal connected to target electrode part $T_1$, and a "carry-out" output terminal connected to the target electrode for the second electron beam.

References Cited in the file of this patent

UNITED STATES PATENTS

| | | |
|---|---|---|
| 2,404,106 | Snyder | July 16, 1946 |
| 2,692,727 | Hobbs et al. | Oct. 26, 1954 |

OTHER REFERENCES

Proceedings of Conference on Automatic Computing Machines, Univ. of Sydney, August 1951. Published by the Commonwealth Scientific and Industrial Research Organization in Conjunction with the Dept. of Electrical Engineering of the Univ. of Sydney, Melbourne, April 1952. Pages 152 to 157, and related Figs. 1 to 7.